(12) United States Patent
Yamamoto

(10) Patent No.: US 8,441,736 B2
(45) Date of Patent: May 14, 2013

(54) LENS FOR PROJECTION AND PROJECTION-TYPE DISPLAY APPARATUS

(75) Inventor: Chikara Yamamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 105 days.

(21) Appl. No.: 13/248,844

(22) Filed: Sep. 29, 2011

(65) Prior Publication Data

US 2012/0075722 A1 Mar. 29, 2012

(30) Foreign Application Priority Data

Sep. 29, 2010 (JP) .................................. 2010-218015

(51) Int. Cl.
*G02B 9/00* (2006.01)
*G02B 9/60* (2006.01)

(52) U.S. Cl.
USPC ........................................ 359/649; 359/770

(58) Field of Classification Search .................. 359/649, 359/770
See application file for complete search history.

(56) References Cited

U.S. PATENT DOCUMENTS

| 5,519,537 A | 5/1996 | Shikama |
| 6,712,474 B2 | 3/2004 | Narimatsu |
| 6,765,731 B1 | 7/2004 | Cannon |
| 7,656,587 B2 | 2/2010 | Hsu et al. |

FOREIGN PATENT DOCUMENTS

| JP | 2001-124988 | 5/2001 |
| JP | 2009-210596 | 9/2009 |

*Primary Examiner* — William Choi
(74) *Attorney, Agent, or Firm* — Young & Thompson

(57) ABSTRACT

A lens for projection substantially consists of a negative first-lens having a concave surface facing the reduction side, a positive second-lens having a convex surface facing the magnification side, a negative third-lens having a concave surface facing the magnification side, a positive fourth-lens having a convex surface facing the reduction side, and a positive fifth-lens, arranged in this order from the magnification side. Further, the following formulas (A) through (D) are satisfied: $1.2 \leq Bf/f \leq 2.5$ (A); $-3.0 \leq f3F/f \leq -0.8$ (B); $1.4 \leq f5F/f5 \leq 8.5$ (C); and $1.0 \leq d12/f \leq 2.7$ (D), where Bf is a back focus in air of the entire system of the lens for projection, f is the focal length of the entire system of the lens for projection, f3F is the focal length of a magnification-side surface of the third lens, f5F is the focal length of a magnification-side surface of the fifth lens, f5 is the focal length of the fifth lens, and d12 is an air space between the first lens and the second lens.

17 Claims, 8 Drawing Sheets

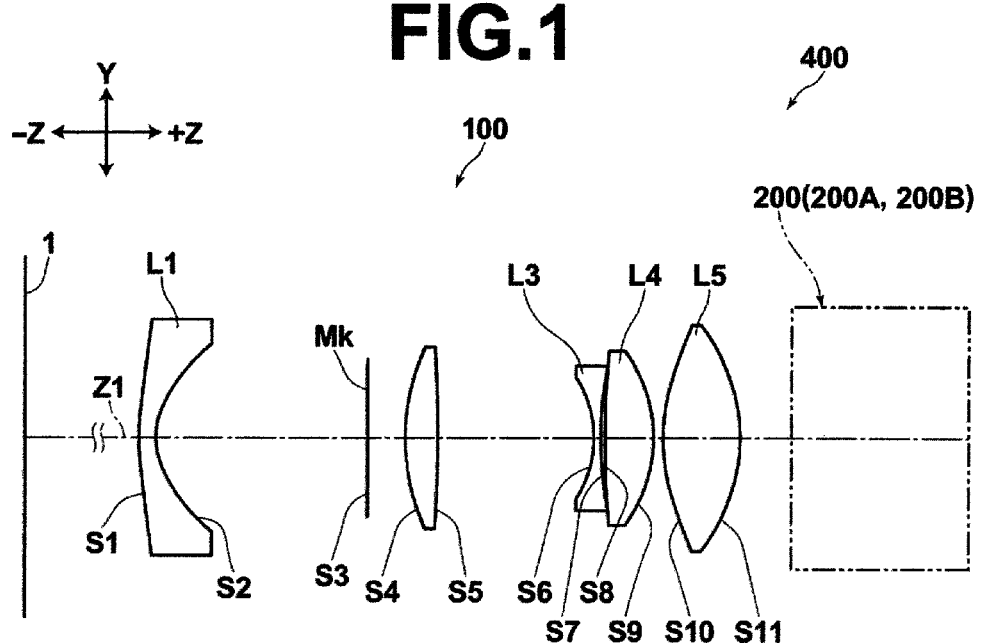
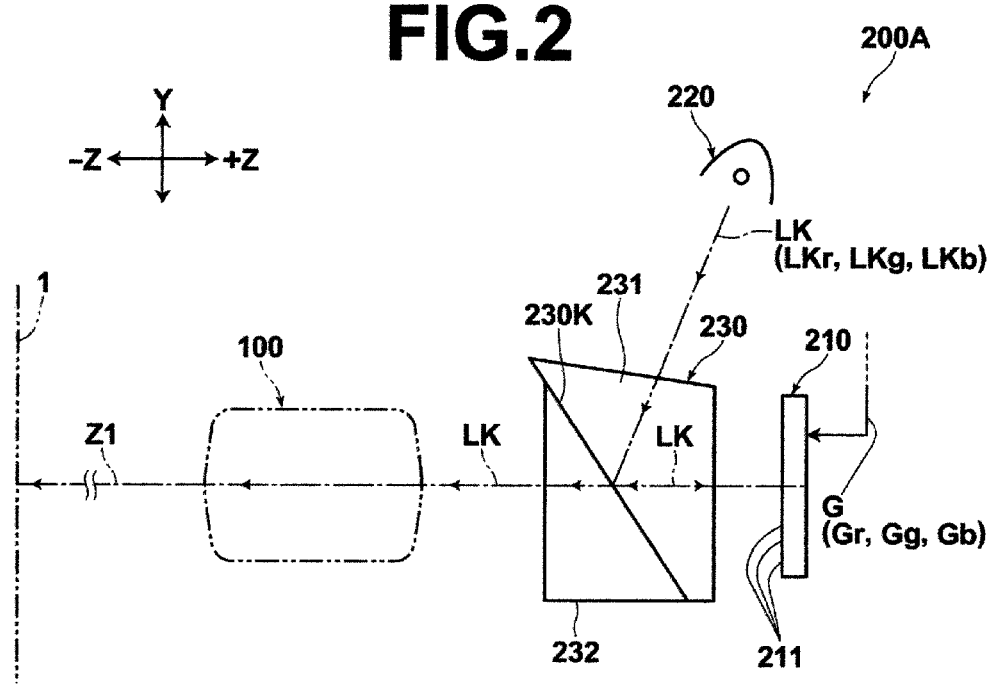

EXAMPLE 1-1

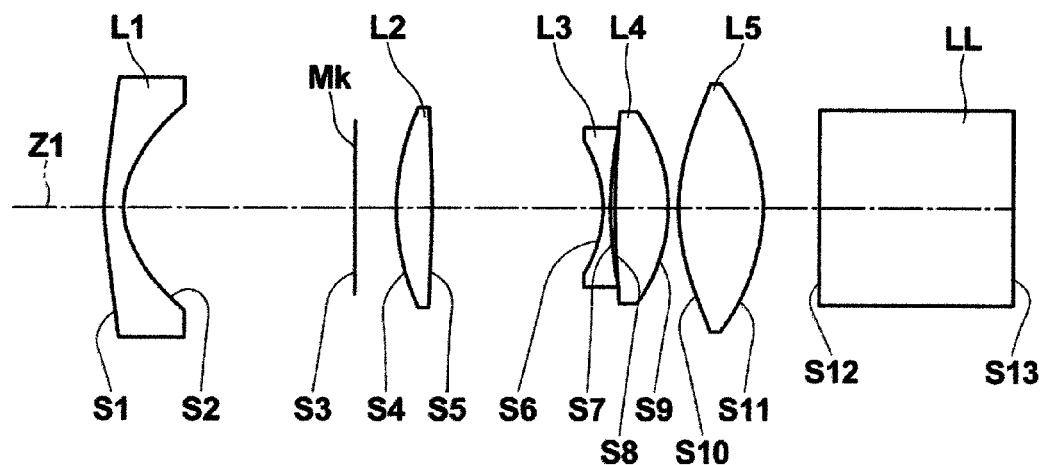
FIG.5 EXAMPLE 1-2
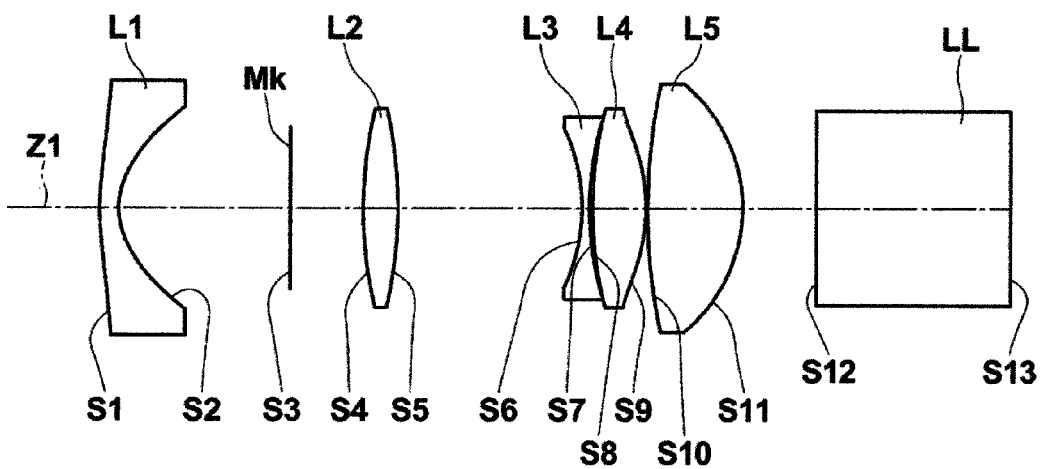
FIG.6 EXAMPLE 1-3

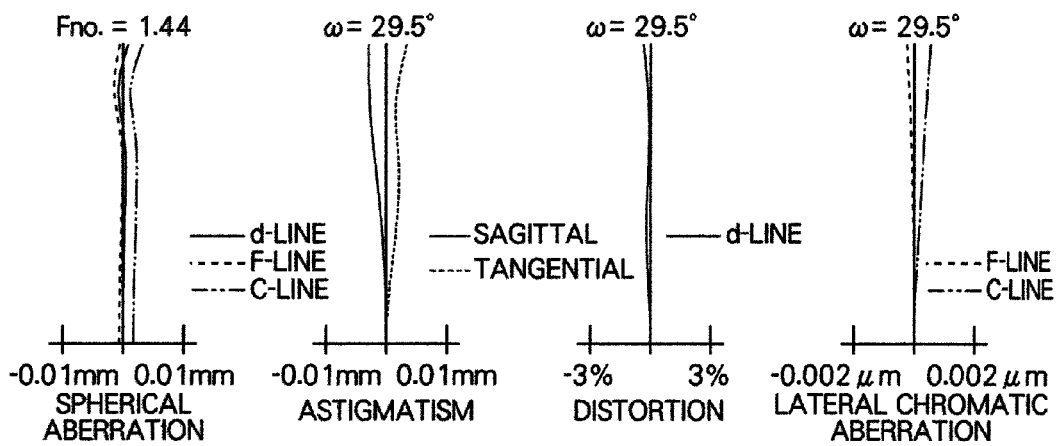
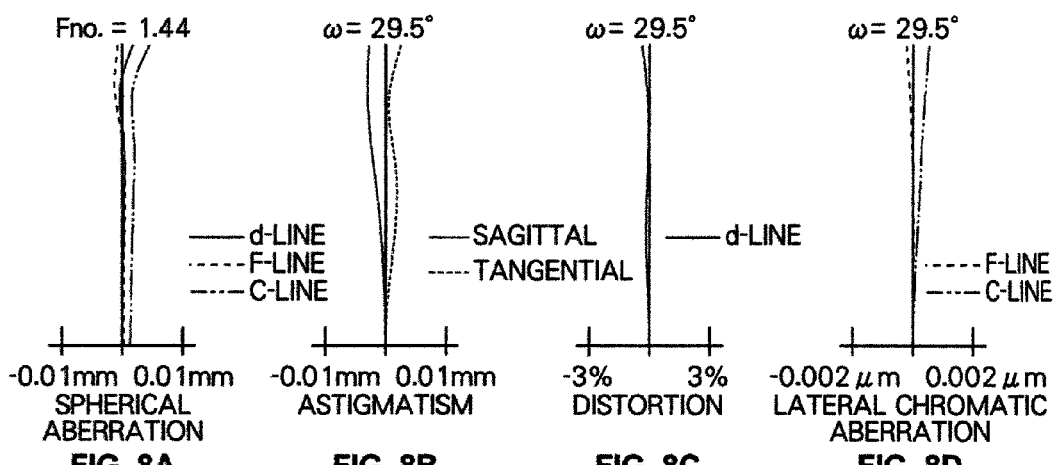
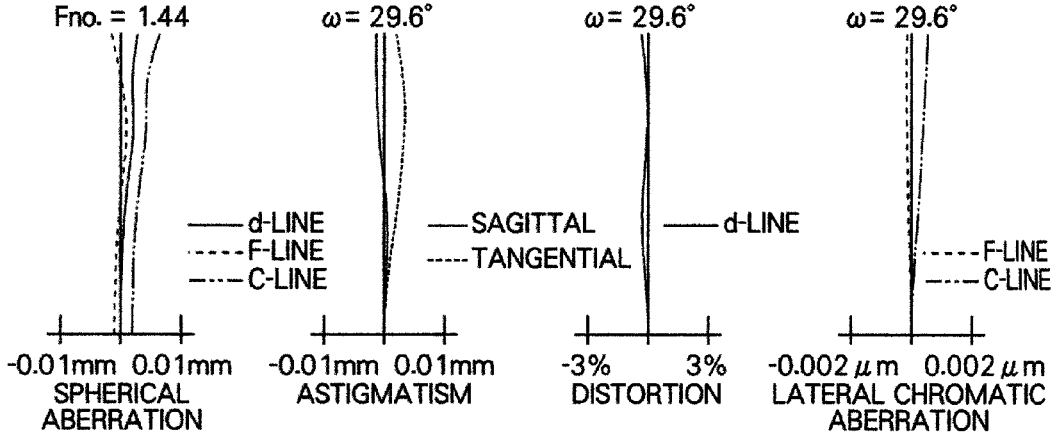

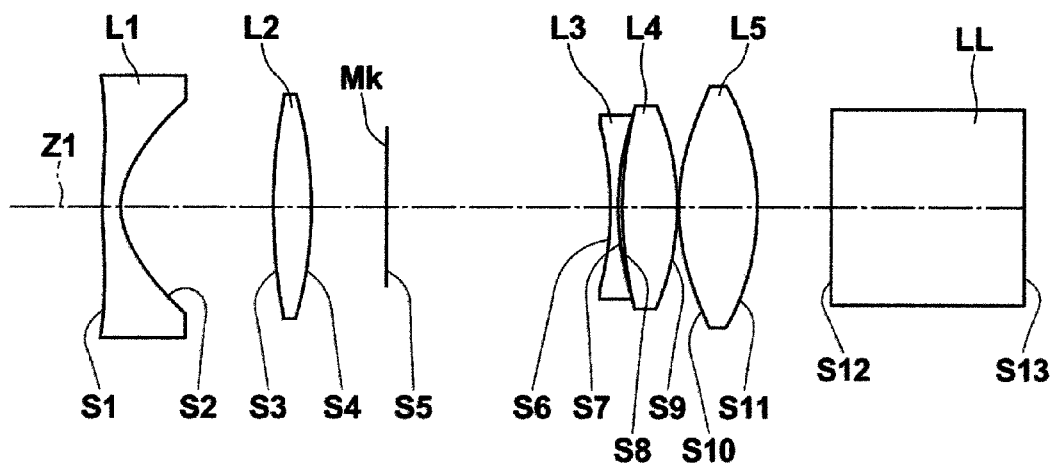
FIG.10 COMPARATIVE EXAMPLE 1
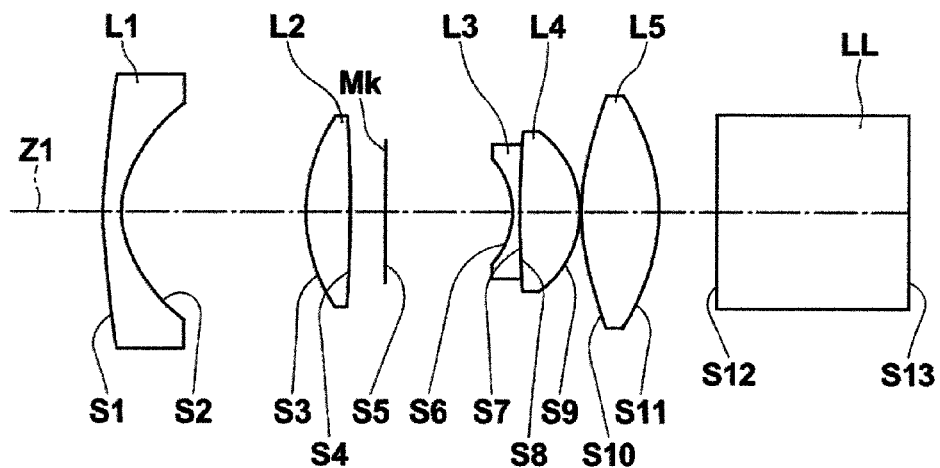
FIG.11 COMPARATIVE EXAMPLE 2

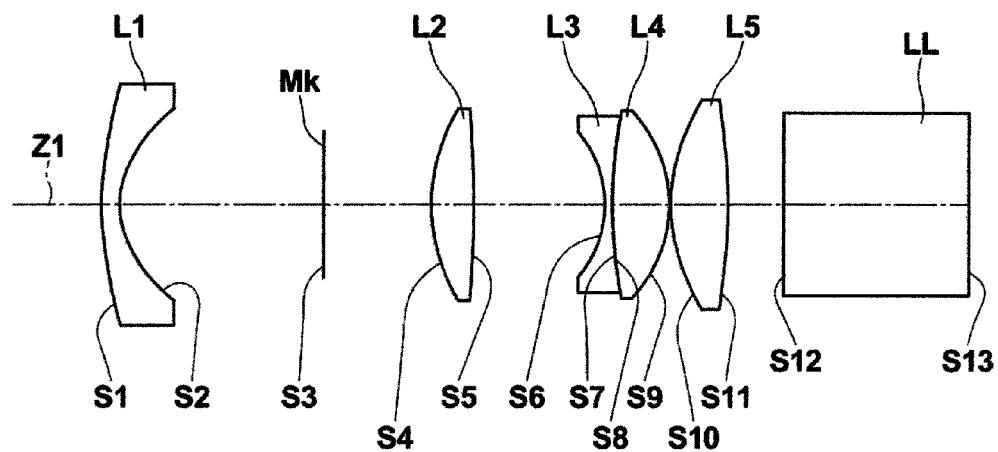
FIG.12 COMPARATIVE EXAMPLE 3
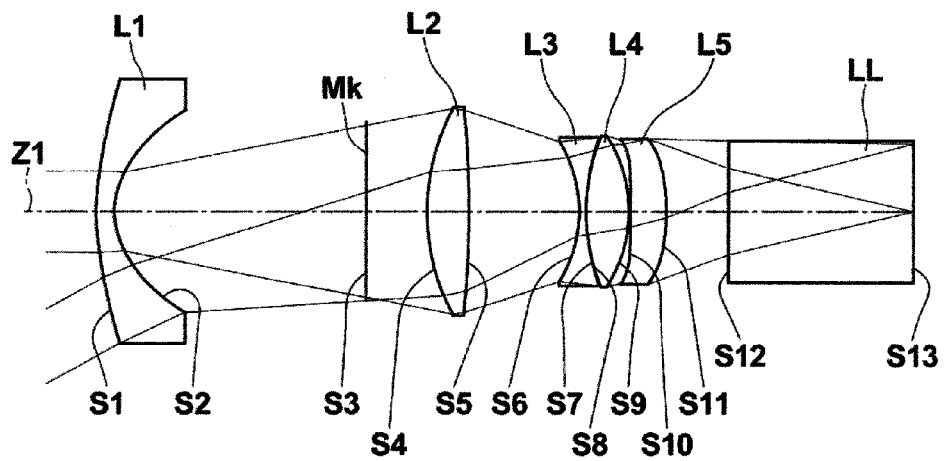
FIG.13 COMPARATIVE EXAMPLE 4

COMPARATIVE EXAMPLE 1

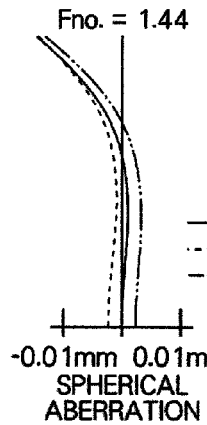
Fno. = 1.44
-0.01mm 0.01mm
SPHERICAL
ABERRATION
— d-LINE
---- F-LINE
—-— C-LINE
FIG. 14A

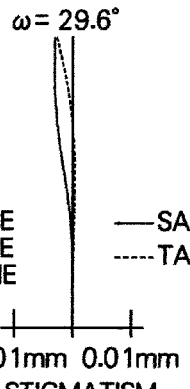
ω = 29.6°
-0.01mm 0.01mm
ASTIGMATISM
— SAGITTAL
----- TANGENTIAL
FIG. 14B

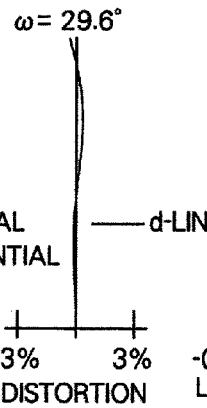
ω = 29.6°
-3%    3%
DISTORTION
— d-LINE
FIG. 14C

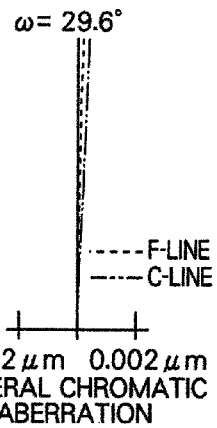
ω = 29.6°
-0.002μm 0.002μm
LATERAL CHROMATIC
ABERRATION
---- F-LINE
—-— C-LINE
FIG. 14D

COMPARATIVE EXAMPLE 2

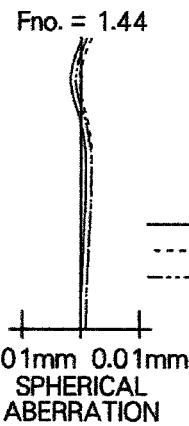
Fno. = 1.44
-0.01mm 0.01mm
SPHERICAL
ABERRATION
— d-LINE
---- F-LINE
—-— C-LINE
FIG. 15A

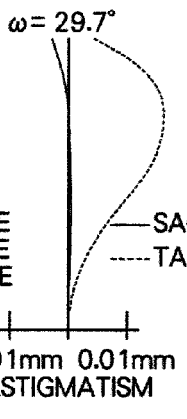
ω = 29.7°
-0.01mm 0.01mm
ASTIGMATISM
— SAGITTAL
----- TANGENTIAL
FIG. 15B

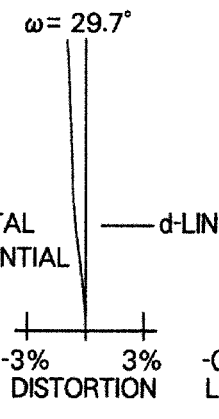
ω = 29.7°
-3%    3%
DISTORTION
— d-LINE
FIG. 15C

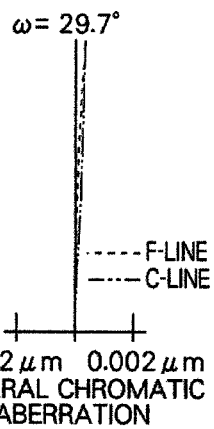
ω = 29.7°
-0.002μm 0.002μm
LATERAL CHROMATIC
ABERRATION
---- F-LINE
—-— C-LINE
FIG. 15D

COMPARATIVE EXAMPLE 3

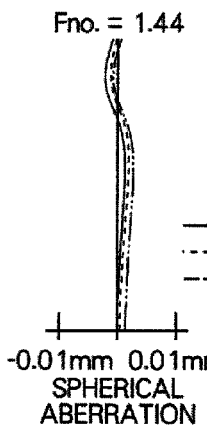
Fno. = 1.44
-0.01mm 0.01mm
SPHERICAL
ABERRATION
— d-LINE
---- F-LINE
—-— C-LINE
FIG. 16A

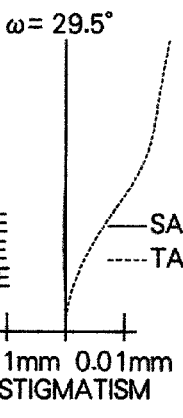
ω = 29.5°
-0.01mm 0.01mm
ASTIGMATISM
— SAGITTAL
----- TANGENTIAL
FIG. 16B

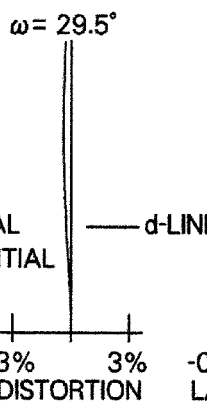
ω = 29.5°
-3%    3%
DISTORTION
— d-LINE
FIG. 16C

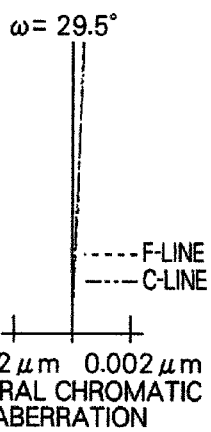
ω = 29.5°
-0.002μm 0.002μm
LATERAL CHROMATIC
ABERRATION
---- F-LINE
—-— C-LINE
FIG. 16D

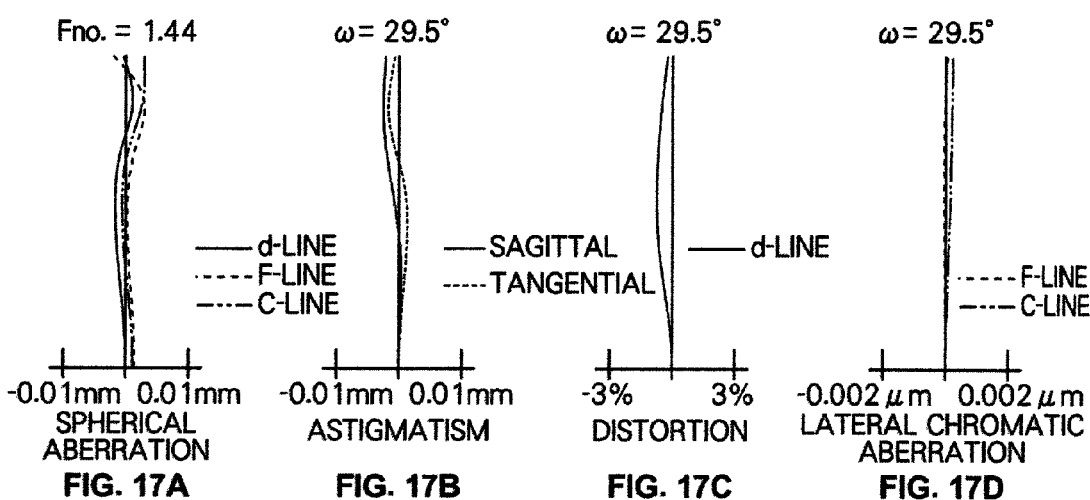

LENS FOR PROJECTION AND PROJECTION-TYPE DISPLAY APPARATUS

BACKGROUND OF THE INVENTION

1. Field of the Invention

The present invention relates to a lens for projection and a projection-type display apparatus. In particular, the present invention relates to a lens for projection substantially consisting of five lenses and a projection-type display apparatus using the lens for projection.

2. Description of the Related Art

Projection-type display apparatuses (also called as projectors) rapidly spread in recent years. The projection-type display apparatuses project images represented by image data output from personal computers or the like onto screens. As such projectors, a projector that projects, through a lens for projection, light that has been output from a light source and modulated by a light valve onto a screen is known. As the light valve, a transmission-type liquid crystal device, a reflection-type liquid crystal device, a DMD (Digital Micromirror Device), and the like are known. In the DMD, micromirrors, the angles of which are changeable, are arranged.

Such a projector needs to have a space for structuring an optical system for guiding light output from the light source to the light valve and an optical system for guiding light modulated by the light valve to the lens for projection. Therefore, a lens for projection to be mounted on the projector has a long back focus so that such a space is provided between the lens for projection and the light valve.

For example, a projector for projecting color images, which includes light valves for modulating red light, green light and blue light respectively, needs to have a space between the lens for projection and the light valves to arrange optical systems for guiding light of each color to respective light valves and optical systems for guiding light modulated by the light valves to a lens for projection.

As a lens for projection in which a back focus for securing such a space is set, a lens for projection composed of five lenses, and which has an F-number in the range of 2.0 to 5.6 is known (please refer to U.S. Pat. No. 5,519,537 (Patent Document 1), Japanese Unexamined Patent Publication No. 2001-124988 (Patent Document 2), Japanese U.S. Pat. No. 6,712,474 (Patent Document 3), U.S. Pat. No. 6,765,731 (Patent Document 4), Japanese Unexamined Patent Publication No. 2009-210596 (Patent Document 5), and Specification of U.S. Pat. No. 7,656,587 (Patent Document 6)).

Here, when the number of lenses is counted, if a cemented lens composed of n lenses is included, the number of lenses of the cemented lens is regarded as n.

When images are projected onto a screen through a projector, a setting place of the screen is generally made dark, but a demand for watching images without making the setting place very dark is strong. However, projectors in which lenses for projection having relatively large F-numbers, as disclosed in Patent Documents 1 through 6, are mounted do not meet such a demand.

Specifically, the lenses for projection (F-number: 2.0 through 5.6) disclosed in Patent Documents 1 through 6 have problems in the power balance of lenses constituting each of the lenses for projection. Therefore, If the F-number of the lens for projection is tried to be reduced (faster lens), aberrations are insufficiently corrected, or the size of the lens for projection becomes large.

SUMMARY OF THE INVENTION

In view of the foregoing circumstances, it is an object of the present invention to provide a lens for projection that can set a space between the lens for projection and a light valve to structure an optical system for guiding light output from a light source to the light valve and an optical system for guiding light modulated by the light valve to the lens for projection while suppressing generation of aberrations and an increase in the size of an apparatus to a large size, and that can reduce the F-number (faster lens). Further, it is another object of the present invention to provide a projection-type display apparatus using the lens for projection. A lens for projection of the present invention is a lens for projection substantially consisting of five lenses, wherein a negative first lens having a concave surface facing the reduction side of the lens for projection, a positive second lens having a convex surface facing the magnification side of the lens for projection, a negative third lens having a concave surface facing the magnification side, a positive fourth lens having a convex surface facing the reduction side, and a positive fifth lens are arranged in this order from the magnification side, and wherein the following formulas (A) through (D) are satisfied at the same time:

$$1.25 \leq Bf/f \leq 2.5 \quad (A);$$

$$-3.0 \leq f3F/f \leq -0.8 \quad (B);$$

$$1.4 \leq f5F/f5 \leq 8.5 \quad (C); \text{ and}$$

$$1.0 \leq d12/f \leq 2.7 \quad (D), \text{ where}$$

Bf is a back focus in air of the entire system of the lens for projection, f is the focal length of the entire system of the lens for projection, f3F is the focal length of a magnification-side surface of the third lens, f5F is the focal length of a magnification-side surface of the fifth lens, f5 is the focal length of the fifth lens, and d12 is an air space between the first lens and the second lens.

In a lens for projection of the present invention, it is desirable that a gap is present between a reduction-side surface of the third lens and a magnification-side surface of the fourth lens, and that the following formula (E) is satisfied:

$$f34n/f \leq -2.5 \quad (E), \text{ where}$$

f34n is the focal length of an air lens formed between the reduction-side surface of the third lens and the magnification-side surface of the fourth lens.

It is desirable that a lens for projection of the present invention satisfies the following formula (F):

$$2.5 \leq f2B/f \leq 25.0 \quad (F), \text{ where}$$

f2B is the focal length of a reduction-side surface of the second lens.

It is desirable that the reduction side of the lens for projection of the present invention is telecentric.

In a lens for projection of the present invention, it is desirable that at least one of surfaces of the first lens is aspheric. Further, it is desirable that at least one of surfaces constituting the fourth lens and the fifth lens is aspheric.

It is desirable that the first lens having at least an aspheric surface is made of resin, and that the fourth lens is made of resin if the fourth lens has at least an aspheric surface, and that the fifth lens is made of resin if the fifth lens has at least an aspheric surface.

All of lenses constituting the lens for projection of the present invention may be single lenses. Alternatively, the lens for projection of the present invention may include a cemented lens or lenses.

It is desirable that a lens for projection of the present invention satisfies the following formula (G):

$$Fno \leq 1.8 \qquad (G),$$ where

Fno is the F-number of the entire system of the lens for projection.

A projection-type display apparatus of the present invention is a projection-type display apparatus comprising:

a lens for projection of the present invention;
a light source; and
a light valve for modulating rays of light output from the light source,
wherein rays of light modulated by the light valve are projected through the lens for projection.

The focal length of an air lens is a combined focal length in air of the focal length of the magnification-side surface of the air lens and the focal length of the reduction-side surface of the air lens. Specifically, the focal length of an air lens is represented by the following equation:

1/Focal Length of Air Lens=(1−Refractive Index of Magnification-Side Lens)/Radius of Curvature of Magnification-Side Surface of Air Lens+(Refractive Index of Reduction-Side Lens)/Radius of Curvature of Reduction-Side Surface of Air lens+ (1−Refractive Index of Magnification-Side Lens)×(1−Refractive Index of Reduction-Side Lens)×Air Space/(Radius of Curvature of Magnification-Side Surface of Air lens×Radius of Curvature of Reduction-Side Surface of Air lens).

The expression "the reduction side is telecentric" represents a state in which a line bisecting the angle of each cross section of rays of light passing through all positions on an image circle is nearly parallel to an optical axis with respect to the rays of light condensing into an arbitrary reduction-side point, as illustrated in a cross section of FIG. 4 (Example 1). Therefore, the state is not limited to a completely telecentric state. In other words, the state is not limited to a state in which the line bisecting the angle is completely parallel to the optical axis, and some difference may be present. Here, some difference means that the inclination of the bisecting line with respect to the optical axis is within the range of ±3°.

When the number of lenses is counted, if a cemented lens composed of n lenses is included, the number of lenses of the cemented lens is regarded as n. Meanwhile, an air lens is not counted when the number of lenses is counted.

Back focus is a length (in air) on an optical axis from a most-reduction-side lens surface of lens surfaces constituting the lens for projection to a focal point on the reduction side of the lens for projection.

The focal length of each lens and the focal length of plural lenses in combination (combined focal length) are classified into positive and negative. The focal length of a lens or lenses is regarded as being positive when a focal point of rays passed through the lens or lenses is located on the exit side of the lens or lenses. The focal length of a lens or lenses is regarded as being negative when a focal point of rays passed through the lens or lenses is located on the incident side of the lens or lenses.

Focal length Fsurf of a lens surface is obtained by using the following equation:

$$F\text{surf}=r/(n2-n1),$$ where n1 is the refractive index of a medium on the magnification side of the lens surface, n2 is the refractive index of a medium on the reduction side of the lens surface, and r is the radius of curvature of the lens surface.

The radius of curvature is positive when the surface is convex toward the magnification side, and negative when the surface is convex toward the reduction side.

Further, the term "reduction-side surface of a lens" means a lens surface formed on the reduction side of the lens. Further, the term "magnification-side surface of a lens" means a lens surface formed on the magnification side of the lens.

With respect to aspheric lenses, the term "positive" and the term "negative" are used to refer to whether a paraxial region of an aspheric lens is positive or negative. Further, with respect to aspheric surfaces, the term "positive", the term "negative", the term "concave", and the term "convex" are used to refer to whether a paraxial region of an aspheric surface is positive or negative, and concave or convex.

According to a lens for projection of the present invention and a projection-type display apparatus of the present invention, the lens for projection substantially consists of five lenses. Further, a negative first lens having a concave surface facing the reduction side of the lens for projection, a positive second lens having a convex surface facing the magnification side of the lens for projection, a negative third lens having a concave surface facing the magnification side, a positive fourth lens having a convex surface facing the reduction side, and a positive fifth lens are arranged in this order from the magnification side. Further, formulas (A) through (D) are satisfied at the same time. Therefore, it is possible to obtain a lens having a smaller F-number (faster lens) while suppressing generation of aberrations and an increase in the size of an apparatus to a large size.

Specifically, in the present invention, the arrangement of positive and negative lenses (power balance) is appropriately set as described above. Therefore, it is possible to maintain the balance of aberrations in an excellent manner while constituting the lens for projection using a small number of lenses (five lenses). Further, it is possible to provide a lens for projection that has a small F-number (fast lens) without causing the size of an apparatus to become large. Therefore, it is possible to obtain a lens for projection that is small in size and light in weight, and that has high performance.

If the lens for projection is constructed in such a manner that the value of Bf/f is lower than the lower limit defined by the formula (A): $1.2 \leq Bf/f \leq 2.5$, which defines the range of a ratio of back focus Bf in air of the entire lens system to focal length f of the entire lens system, the back focus becomes small. Therefore, a space for arranging an optical system for illumination and an optical system for guiding light becomes small. The optical system for illumination guides light output from a light source to a light valve, and the optical system for guiding light guides light modulated by the light valve to the lens for projection. Consequently, it becomes difficult to arrange the optical system for illumination and the optical system for guiding light.

In contrast, if the lens for projection is constructed in such a manner that the value of Bf/f exceeds the upper limit defined by the formula (A): $1.2 \leq Bf/f \leq 2.5$, the size of the lens for projection as a whole becomes large.

Further, if the lens for projection is constructed in such a manner that the value of f3F/f is lower than the lower limit defined by the formula (B): $-3.0 \leq f3F/f \leq -0.8$, which regulates the range of a ratio of focal length f3F of a magnification-side surface of the third lens to focal length f of the entire lens system (lens for projection), the size of the lens for projection as a whole becomes large. Further, it becomes difficult to correct spherical aberrations.

In contrast, if the lens for projection is constructed in such a manner that the value of f3F/f exceeds the upper limit defined by the formula (B): −3.0≦f3F/f≦−0.8, it becomes difficult to correct an image plane, while securing a predetermined back focus.

Further, if the lens for projection is constructed in such a manner that the value of f5F/f5 is lower than the lower limit defined by the formula (C): 1.4≦f5F/f5≦8.5, which defines the range of a ratio of focal length f5F of a magnification-side surface of the fifth lens to focal length f5 of the fifth lens, correction of an image plane becomes difficult.

In contrast, if the lens for projection is constructed in such a manner that the value of f5F/f5 exceeds the upper limit defined by the formula (C): 1.4f5F/f5≦8.5, it becomes difficult to make the reduction side of the lens for projection telecentric. Further, the size of a lens or lenses arranged on the reduction side becomes large.

Further, if the lens for projection is constructed in such a manner that the value of d12/f is lower than the lower limit defined by the formula (D): 1.0d12/f2.7, which regulates the range of a ratio of air space d12 between the first lens and the second lens to focal length f of the entire lens system, correction of spherical aberrations and correction of an image plane become difficult.

In contrast, if the lens for projection is constructed in such a manner that the value of d12/f exceeds the upper limit defined by the formula (D), the size of the lens for projection becomes large.

Further, it becomes difficult to secure a predetermined back focus. Further, the expression "a lens for projection substantially consisting of n lenses" includes lenses for projection which are equipped with: lenses substantially without any power; optical elements other than lenses, such as apertures and glass covers; and mechanical components, such as lens flanges, lens barrels, imaging elements, and camera shake correcting mechanisms; in addition to the n lens groups.

BRIEF DESCRIPTION OF THE DRAWINGS

FIG. 1 is a schematic cross section illustrating the structure of a projection-type display apparatus including a lens for projection according to an embodiment of the present invention;

FIG. 2 is an enlarged cross section of a light modulation unit included in a projection-type display apparatus;

FIG. 5 is a schematic cross section illustrating the structure of a lens for projection in Example 1-2;

FIG. 6 is a schematic cross section illustrating the structure of a lens for projection in Example 1-3;

FIGS. 7A, 7B, 7C and 7D are diagrams illustrating various aberrations of the lens for projection in Example 1-1;

FIGS. 8A, 8B, 8C and 8D are diagrams illustrating various aberrations of the lens for projection in Example 1-2;

FIGS. 9A, 9B, 9C and 9D are diagrams illustrating various aberrations of the lens for projection in Example 1-3;

FIG. 10 is a schematic cross section illustrating the structure of a lens for projection in Comparative Example 1;

FIG. 11 is a schematic cross section illustrating the structure of a lens for projection in Comparative Example 2;

FIG. 12 is a schematic cross section illustrating the structure of a lens for projection in Comparative Example 3;

FIG. 13 is a schematic cross section illustrating the structure of a lens for projection in Comparative Example 4;

FIGS. 14A, 14B, 14C and 14D are diagrams illustrating various aberrations of the lens for projection in Comparative Example 1;

FIGS. 15A, 15B, 15C and 15D are diagrams illustrating various aberrations of the lens for projection in Comparative Example 2;

FIGS. 16A, 16B, 16C and 16D are diagrams illustrating various aberrations of the lens for projection in Comparative Example 3; and FIGS. 17A, 17B, 17C and 17D are diagrams illustrating various aberrations of the lens for projection in Comparative Example 4.

DESCRIPTION OF THE PREFERRED EMBODIMENTS

Figure 3:
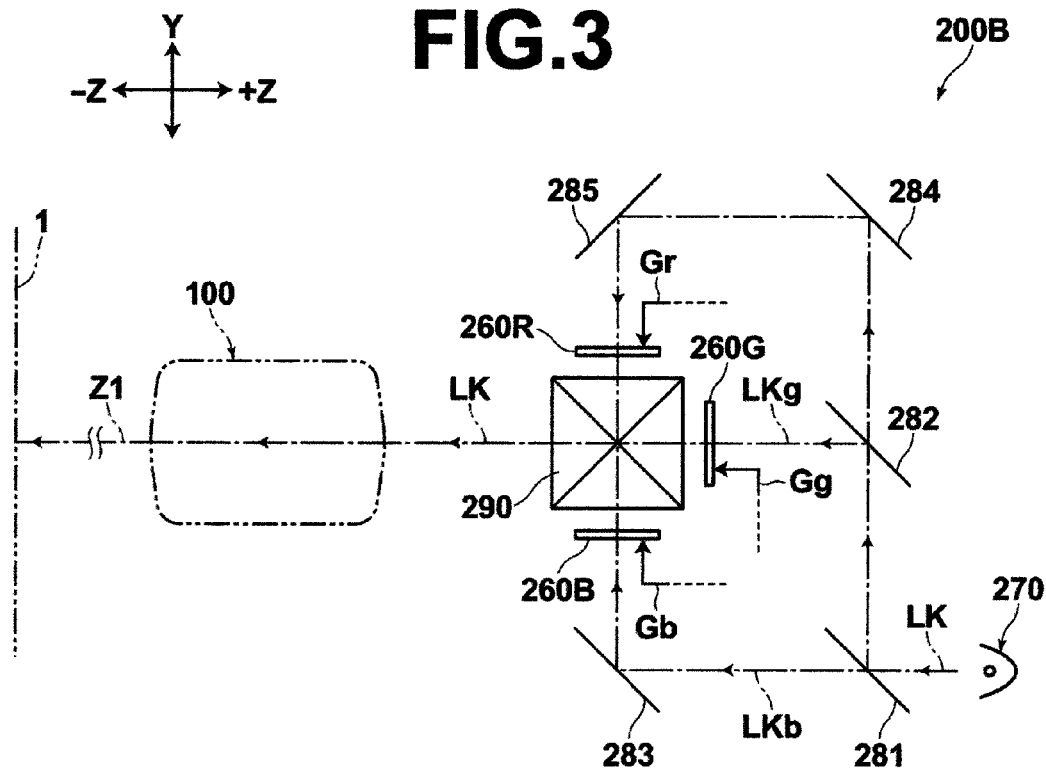
FIG. 3 is an enlarged cross section of another light modulation unit included in a projection-type display apparatus.

Hereinafter, a lens for projection of the present invention and a projection-type display apparatus including the lens for projection will be described with reference to drawings.

FIG. 1 is a schematic cross section illustrating the structure of a projection-type display apparatus including a lens for projection of the present invention.

A projection-type display apparatus 400 illustrated in FIG. 1 includes a lens 100 for projection and a light modulation unit 200. The light modulation unit 200 modulates, by a light valve, rays of light output from a light source. The rays of light modulated in the light modulation unit 200 are passed through the lens 100 for projection, and projected onto a screen 1.

<Basic Structure of Lens for Projection>

Next, the basic structure of the lens 100 for projection will be described.

The lens 100 for projection substantially consists of negative first lens L1 having a concave surface facing the reduction side (the side indicated by arrow +Z in FIG. 1) of the lens for projection, positive second lens L2 having a convex surface facing the magnification side (the side indicated by arrow −Z in FIG. 1) of the lens for projection, negative third lens L3 having a concave surface facing the magnification side, positive fourth lens L4 having a convex surface facing the reduction side, and positive fifth lens L5, which are arranged in this order from the magnification side.

In other words, the lens 100 for projection substantially consists of five lenses, and first lens L1 through fifth lens L5 are arranged in this order from the magnification side of the lens 100 for projection.

Further, the lens 100 for projection satisfies the following formulas (A) through (D) at the same time:

$$1.2 \leq Bf/f \leq 2.5 \quad \text{(A)};$$

$$-3.0 \leq f3F/f \leq 0.8 \quad \text{(B)};$$

$$1.4 \leq f5F/f5 \leq 8.5 \quad \text{(C); and}$$

$$1.0 \leq d12/f \leq 2.7 \quad \text{(D), where}$$

Bf is a back focus, f is the focal length of the entire lens system, f3F is the focal length of a magnification-side surface of the third lens L3, f5F is the focal length of a magnification-side surface of the fifth lens L5, f5 is the focal length of the fifth lens L5, and d12 is an air space between the first lens L1 and the second lens L2.

The back focus Bf is a length (in air), on an optical axis, from a last lens surface of lenses constituting the lens 100 for projection (a lens surface arranged closest to the light modulation unit 200 among lens surfaces) to a rear-side focal point (a focal point of the lens 100 projection set on the light modulation unit 200 side).

Here, the back focus Bf corresponds to a length (in air), on an optical axis, from lens surface S11 to a light valve (a DMD 210 and liquid crystal panels 260R through 260B, which will be described later). The lens surface S11 is located on the most reduction side among lens surfaces constituting the lens 100 for projection.

Next, the light modulation unit 200 will be described.

<Regarding a Light Modulation Unit Using a DMD as a Light Valve>

FIG. 2 is a diagram illustrating a light modulation unit adopting a DMD (Digital Micromirror Device) as a light valve.

A light modulation unit 200A illustrated in FIG. 2 includes a DMD 210, a light source 220, and a total internal reflection prism (hereinafter referred to as a TIR prism 230). The TIR prism 230 guides rays Lk of light output from the light source 220 to the DMD 210.

The rays Lk of light output from the light source 220 enter the TIR prism 230, and are totally reflected at a boundary plane 230K between two prisms 231, 232, which constitute the TIR prism 230. The totally reflected rays Lk of light enter the DMD 210. Further, the rays Lk of light that have entered the DMD 210 are reflected by a multiplicity of micromirrors 211 constituting the DMD 210, and modulated. Specifically, the micromirrors 211 deflect rays Lk of light, based on image data G input to the DMD 210, to an ON direction (the direction of the lens 100 for projection) or to an OFF direction (a direction other than the direction of the lens 100 for projection). Accordingly, the rays Lk of light that have entered the DMD 210 are modulated.

The rays Lk of light modulated by the DMD 210 pass through the TIR prism 230, and enter the reduction side (the side indicated by arrow +Z in FIG. 2) of the lens 100 for projection. Further, the rays Lk of light are output from the magnification side (the side indicated by arrow −Z in FIG. 2) of the lens 100 for projection, and projected onto a screen 1. Accordingly, rays Lk of light modulated by the DMD 210 and magnified by the lens 100 for projection are projected onto the screen 1. Consequently, an image represented by image data input to the DMD 210 is formed on the screen 1.

Here, it is possible to display a color image on the screen 1, for example, by adopting a field sequential image display method. In the field sequential image display method, red rays Lkr of light output from the light source 220, green rays Lkg of light output from the light source 220, and blue rays Lkb of light output from the light source 220 are temporally divided (time division), and caused to sequentially enter the DMD 210. Further, image data Gr representing a red image, image data Gg representing a green image, and image data Gb representing a blue image are input to the DMD 210 synchronously with entrance of the rays of light of respective colors into the DMD 210, and the rays of light of respective colors are modulated.

<Regarding a Light Modulation Unit Using a Liquid Crystal Panel as a Light Valve>

FIG. 3 is a diagram illustrating a light modulation unit using a transmission-type liquid crystal panel as a light valve.

A light modulation unit 200B illustrated in FIG. 3 includes a light source 270, dichroic mirrors 281, 282, liquid crystal panels 260R, 260G, 260B, and a dichroic prism 290 for combining colors. The light source 270 outputs white light, and the dichroic mirrors 281, 282 separate the rays Lk of white light output from the light source 270 into red light, green light and blue light. The liquid crystal panels 260R, 260G, 260B modulate the rays Lk of light separated into respective colors (red rays Lkr of light, green rays Lkg of light, and blue rays Lkb of light). Further, the dichroic prism 290 combines, into a bundle of rays Lk of light, the rays Lk of light of respective colors (red rays Lkr of light, green rays Lkg of light, and blue rays Lkb of light) that have been modulated by being transmitted through the liquid crystal panels 260R, 260G, 260B.

The white light output from the light source 270 is separated into rays Lk of light of respective colors of red, green and blue (red rays Lkr of light, green rays Lkg of light, and blue rays Lkb of light) by the dichroic mirrors 281, 282. Further, the separated rays enter the liquid crystal panels 260R, 260G, 260B, respectively, through the total reflection mirrors 283, 284, 285, or the like.

The red rays Lkr of light, the green rays Lkg of light, and the blue rays Lkb of light modulated through the liquid crystal panels 260R, 260G, 260B are combined into a bundle of rays Lk of light through the dichroic prism 290 for combining colors.

The red rays Lkr of light, the green rays Lkg of light, and the blue rays Lkb of light are modulated, through the liquid crystal panels 260R, 260G, 260B, based on image data Gr, Gg, Gb input to the liquid crystal panels 260R, 260G, 260B, respectively.

The rays Lk of light combined through the dichroic prism 290 for combining colors enter the reduction side (the side indicated by arrow +Z in FIG. 3) of the lens 100 for projection, and are output from the magnification side (the side indicated by arrow −Z in FIG. 3) of the lens 100 for projection. Further, the rays Lk of light are projected onto the screen 1. Accordingly, a color image represented by image data input to each of the liquid crystal panels 260R, 260G, 260B is formed on the screen 1.

<Regarding Structure Further Limiting the Basic Structure of the Lens for Projection>

Next, elements or features that further limit the basic structure of the illustrated lens 100 for projection and the projection-type display apparatus 400, and the actions and the effects of the elements or features will be described. The elements or features that further limit the basic structure are not essential to the lens 100 for projection of the present invention nor to the projection-type display apparatus 400 of the present invention.

The lens for projection of the present invention and the projection-type display apparatus of the present invention may satisfy all of the elements or features that further limit the basic structure. Alternatively, only one of the elements or features, or at least two of the elements or features in combination may be satisfied.

First, the meanings of parameters represented by signs in formulas will be described:

Bf is a back focus in air of the entire system of the lens for projection;

f is the focal length of the entire system of the lens for projection;

f3F is the focal length of a magnification-side surface of the third lens; f5F is the focal length of a magnification-side surface of the fifth lens;

f5 is the focal length of the fifth lens;

d12 is an air space between the first lens and the second lens;

f34n is the focal length of an air lens formed between the reduction-side surface of the third lens and the magnification-side surface of the fourth lens;

f2B is the focal length of a reduction-side surface of the second lens; and

Fno is the F-number of the entire system of the lens for projection.

[Structure Limited by Formula (B')]

Formula (B'): $-2.5 \leq f3F/f \leq -1.0$ further limits the range defined by the formula (B): $-3.0 \leq f3F/f \leq -0.8$, which has been described already. When the lens 100 for projection is constructed in such a manner to satisfy the formula (B'), it is possible to obtain more desirable lens properties, compared with the case of satisfying the formula (B).

[Structure Limited by Formula (C')]

Formula (C'): $1.7 \leq f5F/f5 \leq 6.0$ further limits the range defined by the formula (C): $1.4 \leq f5F/f5 \leq 8.5$, which has been described already. When the lens 100 for projection is constructed in such a manner to satisfy the formula (C'), it is possible to obtain more desirable lens properties, compared with the case of satisfying the formula (C)

[Structure Limited by Formula (D')]

Formula (D'): $1.4 \leq d12/f \leq 2.5$ further limits the range defined by the formula (D): $1.0 \leq d12/f \leq 2.7$, which has been described already. When the lens 100 for projection is constructed in such a manner to satisfy the formula (D'), it is possible to obtain more desirable lens properties, compared with the case of satisfying the formula (D).

[Structure Limited by Formula (E)]

Formula (E): $f34n/f \leq -2.5$ and formula (E'): $f34n/f \leq -4.5$, which is more desirable than formula (E), regulates the range of a ratio of focal length f34n to focal length f of the entire lens system (lens 100 for projection). The focal length f34n is the focal length of an air lens formed between the reduction-side surface of the third lens and the magnification-side surface of the fourth lens.

If the lens 100 for projection is constructed in such a manner that the value of f34n/f exceeds the upper limit defined by the formula (E), a problem that correction of an image plane becomes difficult arises.

When the lens 100 for projection is constructed in such a manner that the formula (E) or the formula (E') is satisfied, it is possible to prevent generation of such a problem. When the lens 100 for projection is constructed in such a manner to satisfy the formula (E'), it is possible to obtain more desirable lens properties, compared with the case of satisfying the formula (E).

[Structure Limited by Formula (F)]

Formula (F): $2.5 \leq f2B/f \leq 25.0$ regulates the range of a ratio of focal length f2B to focal length f of the entire lens system (lens 100 for projection). The focal length f2B is the focal length of a reduction-side surface of the second lens.

If the lens 100 for projection is constructed in such a manner that the value of f2B/f is lower than the lower limit defined by the formula (F), a problem that correction of spherical aberrations becomes difficult arises.

In contrast, if the lens 100 for projection is constructed in such a manner that the value of f2B/f exceeds the upper limit defined by the formula (F), a problem that correction of spherical aberrations becomes difficult and a problem that the size of the lens for projection becomes large arise.

When the lens 100 for projection is constructed in such a manner to satisfy the formula (F) or (F'), it is possible to prevent generation of such problems. When the lens 100 for projection is constructed in such a manner to satisfy the formula (F'), it is possible to obtain more desirable lens properties, compared with the case of satisfying the formula (F).

[Structure Limited by Formula (G)]

Formula (G): $Fno \leq 1.8$ regulates the range of the F-number of the lens 100 for projection.

It is desirable that the lens 100 for projection is constructed in such a manner that the F-number is less than or equal to 1.8.

It is desirable that the reduction side of the lens 100 for projection is telecentric.

Further, a surface or two surfaces of the first lens L1 may be aspheric. When a surface or two surfaces of the first lens L1 are aspheric, it is possible to suppress generation of distortion.

Further, at least one of lens surfaces S8 through S11, which constitute the fourth lens L4 and the fifth lens L5, may be aspheric. When at least one of the lens surfaces S8 through S11 is aspheric, it is possible to suppress generation of curvature of field.

Further, a lens having at least an aspheric surface may be made of resin.

All of lenses constituting the lens 100 for projection may be single lenses. Alternatively, the lens 100 for projection may include a cemented lens or lenses.

Further, the lens 100 for projection may include mask Mk.

The mask Mk is formed by a member that blocks rays of light passing through the lens 100 for projection. For example, the mask Mk is provided to secure telecentricity by blocking marginal rays that pass through the lens 100 for projection, and to set an F-number.

SPECIFIC EXAMPLES

With reference to FIGS. 4 through 6, FIGS. 7A-7D through 9A-9D, FIGS. 10 through 13, and FIGS. 14A-14D through 17A-17D, and Tables 1 through 8, Examples 1-1 through 1-3 of the lens for projection of the present invention and Comparative Examples 1 through 4, which are outside the range of the present invention, and numerical data or the like thereof will be described together.

Examples 1-1 through 1-3 satisfy all of the formulas (A) through (G).

FIGS. 4 through 6 and FIGS. 10 through 13 are schematic cross sections illustrating the structure of the lenses for projection in Examples 1-1 through 1-3 and Comparative Examples 1 through 4, respectively.

Figure 4:
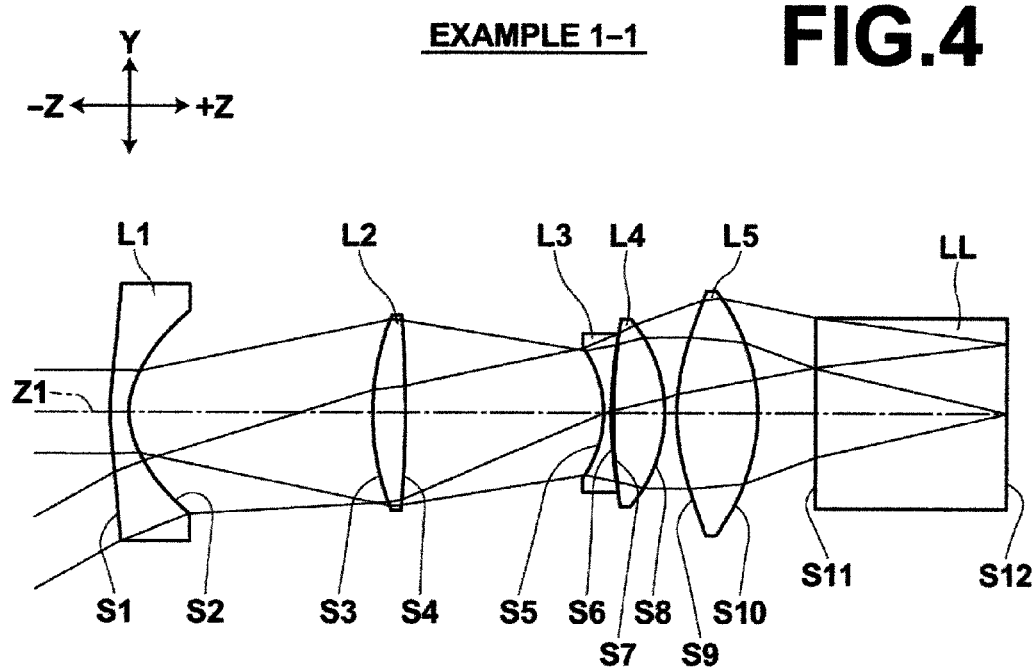
FIG. 4 is a schematic cross section illustrating the structure of a lens for projection in Example 1-1.

In FIG. 4, which is a cross section illustrating a lens for projection in Example 1, optical paths of light passing through the lens for projection are also illustrated. FIG. 4 shows that the reduction side of the lens for projection in Example 1 is telecentric. In the other examples of the lens for projection, the reduction side of the lens for projection may be also telecentric.

In FIGS. 4 through 6 and FIGS. 10 through 13, signs L1, L2, . . . represent lenses constituting the lenses for projection. The signs L1, L2, . . . correspond to the order of arrangement of lenses from the magnification side (the side indicated by arrow −Z in FIGS. 4 through 6 and FIGS. 10 through 13).

Further, sign LL represents an optical member, such as a TIR prism and a dichroic prism for combining colors, that constitutes a light modulation unit. The optical member LL does not constitute a lens for projection.

Tables 1 through 7 show basic data about the lenses for projection in Examples 1-1 through 1-3 and Comparative Examples 1 through 4, respectively. The upper part (indicated by sign (a)) of each of Tables 1 through 7 shows lens data. The lower part (indicated by sign (b)) of each of Tables 1 through 7 shows aspheric coefficients. In the lens data, the mark "*" attached to a surface number indicates that a surface represented by the surface number is an aspheric surface.

Here, the following aspheric equation is used:

$$Z = \frac{Y^2/R}{1+(1-K\cdot Y^2/R^2)^{1/2}} + \sum_{i=3}^{n} A_i \cdot Y^i,$$

where

Z: the depth of an aspheric surface (the length of a perpendicular from a point on an aspheric surface at height Y to a flat plane perpendicular to the optical axis in contact with the vertex of the aspheric surface (mm), Y: height (a distance from the optical axis) (mm), R: a paraxial radius of curvature (radius of curvature in a paraxial region) (mm), K, $A_i$: aspheric coefficients (i=3 through n).

Further, Table 8 shows values with respect to the lenses for projection in Examples 1-1 through 1-3 and Comparative Examples 1 through 4. Table 8 shows values the ranges of which are defined by the inequations of formulas (A) through (G) (values calculated by arithmetic expressions in the inequations, or constants of optical systems of the lenses for projection, which are represented by signs in the inequations). All of the lenses for projection in Examples 1-1 through 1-3 satisfy all of the formulas (A) through (G) at the same time.

In the lens data at the upper part (a) of each of Tables 1 through 7, surface number Si represents the number of an i-th lens surface or the like (i=1, 2, 3, . . . ). The most-magnification-side surface is the first surface, and the surface numbers sequentially increase toward the reduction side (the side indicated by arrow +Z in FIGS. 4 through 6 and FIGS. 10 through 14). The lens data include mask Mk and optical member LL.

In the lens data, the optical member LL is regarded as a parallel flat plate to be represented as data.

Radius Ri of curvature represents the radius of curvature of the i-th surface (i=1, 2, 3, . . . ) (the radius of curvature of the i-th surface is normalized by assuming that the focal length of the entire lens system is 1). Distance Di between surfaces (i=1, 2, 3, . . . ) represents a distance between the i-th surface and an (i+1)th surface on optical axis Z1 (the distance between the surfaces is normalized by assuming that the focal length of the entire lens system is 1). The sign Ri and the sign Di in the lens data correspond to the sign Si (i=1, 2, 3, . . . ), which represents a lens surface or the like.

Further, the sign Ndj represents the refractive index of a j-th optical element (j=1, 2, 3, . . . ) with respect to d-line (wavelength is 587.6 nm). The most-magnification-side optical element is the first optical element, and numbers sequentially increase toward the reduction side. Further, the sign vdj represents the Abbe number of the j-th optical element based on d-line.

Abbe number ν of an optical element based on d-line is obtained by the following equation:

ν=(Nd−1)/(NF−NC), where

NF is the refractive index of the optical member with respect to F-line (486.1 nm), Nd is the refractive index of the optical member with respect to d-line (587.6 nm), and NC is the refractive index of the optical member with respect to C-line (656.3 nm).

In Examples 1-1 through 1-3, lens L1 is made of resin. Further, in Example 1-1, lens L5 is made of resin.

In the lens data of Tables 1 through 7, the radii of curvature and distances between surfaces are normalized by assuming that the focal length of the entire system is 1. Further, the radius of curvature of a surface is positive when the surface is convex toward the magnification side, and negative when the surface is convex toward the reduction side.

Tables 1 through 8 are provided together at the end of the section of "DESCRIPTION OF THE PREFERRED EMBODIMENTS".

FIGS. 7A, 7B, 7C, 7D through FIGS. 9A, 9B, 9C, 9D and FIGS. 14A, 14B, 14C, 14D through FIGS. 17A, 17B, 17C, and 17D are diagrams illustrating various aberrations (spherical aberration, astigmatism, distortion, and lateral chromatic aberration, respectively) of the lenses for projection in Examples 1-1 through 1-3 and Comparative Examples 1 through 4. Aberrations with respect to d-line, F-line or C-line are illustrated.

In the diagrams illustrating distortions, a shift amount from an ideal image height f×tan θ is illustrated. The ideal image height f×tan θ is obtained by using focal length f of entire lens system and half angle θ of view (θ is a variable, and $0 \leq \theta \leq \omega$).

As the numerical data about the examples and the comparative examples, the diagrams illustrating aberrations and the like show, the lenses for projection of the present invention can set a space between the lens for projection and a light valve to structure an optical system for guiding light output from a light source to the light valve and an optical system for guiding light modulated by the light valve to the lens for projection while suppressing generation of aberrations and an increase in the size of an apparatus to a large size. Further, the lenses for projection of the present invention have small F-numbers, in other words, they are fast lenses.

The present invention is not limited to the aforementioned examples, and various modifications are possible without departing from the gist of the present invention. For examples, the values of the radius of curvature of each lens, a distance between surfaces, a refractive index and the like are not limited to the values in the tables, but may be other values.

TABLE 1

EXAMPLE 1-1

(a)

| SURFACE NUMBER Si | LENS DATA | | | |
| --- | --- | --- | --- | --- |
| | Ri | Di | Ndj | vdj |
| *1 | 1.792 | 0.15 | 1.4910 | 57.6 |
| *2 | 0.583 | 1.96 | | |
| 3 | 2.109 | 0.27 | 1.7859 | 44.2 |
| 4 | −9.876 | 1.60 | | |
| 5 | −0.916 | 0.06 | 1.8052 | 25.4 |
| 6 | 3.642 | 0.02 | | |

TABLE 1-continued

EXAMPLE 1-1

| | Ri | Di | Ndj | vdj |
|---|---|---|---|---|
| 7 | 5.233 | 0.41 | 1.7130 | 53.9 |
| 8 | −1.196 | 0.10 | | |
| *9 | 1.708 | 0.65 | 1.4910 | 57.6 |
| *10 | −1.491 | 0.46 | | |
| 11 | ∞ | 1.54 | 1.5163 | 64.1 |
| 12 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −2.0611E−01 | −3.2988E−02 | −9.2965E−01 | 2.0520E+00 | −5.8230E−02 | −3.4154E+00 |
| 2 | 0.0000 | −2.1362E−01 | −9.0597E−02 | −2.4703E−02 | −6.0849E−01 | 2.0005E+00 | 1.8197E+00 |
| 9 | 1.0000 | 0.0000E+00 | −6.8274E−02 | −3.4926E−02 | 6.6632E−02 | −3.4630E−02 | −3.5487E−02 |
| 10 | 1.0000 | 0.0000E+00 | 4.5190E−02 | 6.2052E−02 | −9.7362E−02 | 7.7395E−03 | 3.4726E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.5550E+00 | −1.2508E+00 | 3.1021E−02 | 1.8385E−02 | 9.2787E−03 | 4.2787E−03 |
| 2 | −7.6066E+00 | 5.2825E+00 | −3.2058E−01 | −1.8990E−01 | −1.0001E−01 | −4.8906E−02 |
| 9 | 3.3322E−03 | 1.8266E−02 | 0.0000E+00 | 0.0000E+00 | 0.0000E+00 | 0.0000E+00 |
| 10 | 5.2465E−04 | −1.4037E−02 | 0.0000E+00 | 0.0000E+00 | 0.0000E+00 | 0.0000E+00 |

(SIGN "*" REPRESENTS AN ASPHERIC SURFACE)

TABLE 2

EXAMPLE 1-2

(a)

| SURFACE NUMBER Si | LENS DATA | | | |
|---|---|---|---|---|
| | Ri | Di | Ndj | vdj |
| *1 | 1.685 | 0.15 | 1.4910 | 57.6 |
| *2 | 0.593 | 1.84 | | |
| (Mk) 3 | ∞ | 0.33 | (MASK) | |
| 4 | 1.923 | 0.28 | 1.7859 | 44.2 |
| 5 | −13.003 | 1.36 | | |
| 6 | −0.990 | 0.06 | 1.8052 | 25.4 |
| 7 | 3.277 | 0.04 | | |
| 8 | 8.589 | 0.42 | 1.7130 | 53.9 |
| 9 | −1.301 | 0.08 | | |
| *10 | 1.627 | 0.67 | 1.4875 | 70.2 |
| *11 | −1.473 | 0.44 | | |
| 12 | ∞ | 1.54 | 1.5163 | 64.1 |
| 13 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −1.7750E−01 | −5.3040E−02 | −9.4883E−01 | 2.0753E+00 | −6.1589E−02 | −3.4207E+00 |
| 2 | 0.0000 | −1.7977E−01 | −1.3226E−01 | 4.5679E−02 | −6.5947E−01 | 1.9822E+00 | 1.8447E+00 |
| 10 | 1.0000 | 0.0000E+00 | −6.3801E−02 | −4.7610E−02 | 7.1195E−02 | −2.3106E−02 | −3.5377E−02 |
| 11 | 1.0000 | 0.0000E+00 | 5.1114E−02 | 4.3203E−02 | −8.1379E−02 | 1.2553E−02 | 3.2207E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.5552E+00 | −1.2508E+00 | 3.1349E−02 | 1.8511E−02 | 9.3023E−03 | 4.2719E−03 |
| 2 | −7.5943E+00 | 5.2847E+00 | −3.2440E−01 | −1.9335E−01 | −1.0214E−01 | −5.0006E−02 |
| 10 | −1.5617E−03 | 1.3692E−02 | 0.0000E+00 | 0.0000E+00 | 0.0000E+00 | 0.0000E+00 |
| 11 | −1.8315E−03 | −1.4982E−02 | 0.0000E+00 | 0.0000E+00 | 0.0000E+00 | 0.0000E+00 |

(SIGN "*" REPRESENTS AN ASPHERIC SURFACE)

TABLE 3

EXAMPLE 1-3

(a)

| SURFACE NUMBER Si | LENS DATA | | | |
|---|---|---|---|---|
| | Ri | Di | Ndj | vdj |
| *1 | 1.825 | 0.15 | 1.4910 | 57.6 |
| *2 | 0.555 | 1.36 | | |
| (Mk) 3 | ∞ | 0.58 | (MASK) | |
| 4 | 3.403 | 0.28 | 1.7995 | 42.2 |
| 5 | −3.679 | 1.46 | | |
| 6 | −1.513 | 0.06 | 1.8052 | 25.4 |
| 7 | 2.492 | 0.03 | | |
| *8 | 3.146 | 0.42 | 1.6779 | 55.3 |
| *9 | −1.415 | 0.01 | | |
| 10 | 4.844 | 0.76 | 1.4875 | 70.2 |
| 11 | −1.292 | 0.59 | | |
| 12 | ∞ | 1.54 | 1.5163 | 64.1 |
| 13 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −1.9194E−01 | 6.0434E−02 | −1.0030E+00 | 1.9532E+00 | −1.9676E−02 | −3.3435E+00 |
| 2 | 0.0000 | −1.7970E−01 | 2.4397E−02 | −9.1191E−02 | −6.4031E−01 | 1.9674E+00 | 1.7963E+00 |
| 8 | 1.0000 | 0.0000E+00 | −3.8362E−02 | −1.6484E−02 | 4.7312E−02 | 4.6392E−02 | 1.5065E−02 |
| 9 | 1.0000 | 0.0000E+00 | 5.9667E−02 | 7.5026E−02 | −4.1998E−02 | 1.3128E−03 | 6.5687E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.5254E+00 | −1.2390E+00 | 2.4894E−02 | 1.4104E−02 | 6.9466E−03 | 3.1683E−03 |
| 2 | −7.5185E+00 | 5.2246E+00 | −3.0912E−01 | −1.8222E−01 | −9.5546E−02 | −4.6555E−02 |
| 8 | −1.6922E−02 | −3.0579E−02 | 0.0000E+00 | 0.0000E+00 | 0.0000E+00 | 0.0000E+00 |
| 9 | 7.5740E−02 | 5.4662E−02 | 0.0000E+00 | 0.0000E+00 | 0.0000E+00 | 0.0000E+00 |

(SIGN "*" REPRESENTS AN ASPHERIC SURFACE)

TABLE 4

COMPARATIVE EXAMPLE 1

(a)

| SURFACE NUMBER Si | LENS DATA | | | |
|---|---|---|---|---|
| | Ri | Di | Ndj | vdj |
| *1 | 2.342 | 0.15 | 1.4910 | 57.6 |
| *2 | 0.551 | 1.22 | | |
| 3 | 4.755 | 0.30 | 1.8000 | 42.0 |
| 4 | −3.326 | 0.60 | | |
| (Mk) 5 | ∞ | 1.79 | (MASK) | |
| 6 | −2.655 | 0.06 | 1.8052 | 25.4 |
| 7 | 2.431 | 0.03 | | |
| 8 | 3.284 | 0.44 | 1.7395 | 54.0 |
| 9 | −2.040 | 0.01 | | |
| *10 | 1.774 | 0.63 | 1.4900 | 65.4 |
| *11 | −1.909 | 0.59 | | |
| 12 | ∞ | 1.54 | 1.5163 | 64.1 |
| 13 | ∞ | | | |

(b)

| SURFACE NUMBER Si | ASPHERIC COEFFICIENT | | | | | | |
|---|---|---|---|---|---|---|---|
| | K | A3 | A4 | A5 | A6 | A7 | A8 |
| 1 | 1.0000 | −2.2226E−01 | −1.3203E−02 | −9.3862E−01 | 2.0421E+00 | −5.6840E−02 | −3.3998E+00 |
| 2 | 0.0000 | −2.1130E−01 | −1.5646E−01 | −3.3501E−02 | −6.0628E−01 | 1.9923E+00 | 1.7944E+00 |

TABLE 4-continued

COMPARATIVE EXAMPLE 1

| 10 | 1.0000 | 0.0000E+00 | −3.1744E−02 | −3.3533E−02 | 6.7395E−02 | −3.0030E−02 | −3.3001E−02 |
| 11 | 1.0000 | 0.0000E+00 | 1.7404E−02 | 7.2987E−02 | −9.4489E−02 | 5.5023E−03 | 3.2717E−02 |

| SURFACE | ASPHERIC COEFFICIENT | | | | | |
|---|---|---|---|---|---|---|
| NUMBER Si | A9 | A10 | A11 | A12 | A13 | A14 |
| 1 | 3.5449E+00 | −1.2434E+00 | 2.9779E−02 | 1.5104E−02 | 6.5914E−03 | 6.4596E−03 |
| 2 | −7.6092E+00 | 5.2388E+00 | −2.9865E−01 | −1.2310E−01 | −4.4800E−02 | −1.8071E−01 |
| 10 | −1.2139E−03 | 8.3765E−03 | 0.0000E+00 | 0.0000E+00 | 0.0000E+00 | 0.0000E+00 |
| 11 | −2.3563E−03 | −2.1275E−02 | 0.0000E+00 | 0.0000E+00 | 0.0000E+00 | 0.0000E+00 |

(SIGN "*" REPRESENTS AN ASPHERIC SURFACE)

TABLE 5

COMPARATIVE EXAMPLE 2

(a)

| SURFACE | LENS DATA | | | |
|---|---|---|---|---|
| NUMBER Si | Ri | Di | Ndj | νdj |
| *1 | 1.937 | 0.15 | 1.4910 | 57.6 |
| *2 | 0.667 | 1.47 | | |
| 3 | 1.377 | 0.35 | 1.5969 | 38.7 |
| 4 | −13.567 | 0.28 | | |
| (Mk) 5 | ∞ | 1.02 | (MASK) | |
| 6 | −0.639 | 0.06 | 1.8052 | 25.4 |
| 7 | 8.543 | 0.00 | | |
| 8 | 7.859 | 0.48 | 1.4900 | 65.4 |
| 9 | −0.799 | 0.01 | | |
| *10 | 1.791 | 0.62 | 1.6500 | 59.0 |
| *11 | −1.504 | 0.46 | | |
| 12 | ∞ | 1.54 | 1.5163 | 64.1 |
| 13 | ∞ | | | |

(b)

| SURFACE | ASPHERIC COEFFICIENT | | | | | |
|---|---|---|---|---|---|---|
| NUMBER Si | K | A3 | A4 | A5 | A6 | A7 | A8 |
| 1 | 1.0000 | −1.8674E−01 | −1.1005E−02 | −9.3307E−01 | 2.0649E+00 | −5.9625E−02 | −3.4499E+00 |
| 2 | 0.0000 | −1.9549E−01 | −7.0102E−02 | −1.8780E−02 | −6.0384E−01 | 2.0242E+00 | 1.8414E+00 |
| 10 | 1.0000 | 0.0000E+00 | −9.1455E−02 | −1.3967E−02 | 7.4936E−02 | −3.5507E−02 | −3.7974E−02 |
| 11 | 1.0000 | 0.0000E+00 | 4.3500E−02 | 6.8161E−02 | −9.5489E−02 | 1.0365E−02 | 3.7089E−02 |

| SURFACE | ASPHERIC COEFFICIENT | | | | | |
|---|---|---|---|---|---|---|
| NUMBER Si | A9 | A10 | A11 | A12 | A13 | A14 |
| 1 | 3.5957E+00 | −1.2669E+00 | 3.1473E−02 | 1.8677E−02 | 9.4389E−03 | 4.3585E−03 |
| 2 | −7.6922E+00 | 5.3512E+00 | −3.2493E−01 | −1.9280E−01 | −1.0170E−01 | −4.9804E−02 |
| 10 | 1.8274E−03 | 1.7676E−02 | 0.0000E+00 | 0.0000E+00 | 0.0000E+00 | 0.0000E+00 |
| 11 | 1.7592E−03 | −1.3582E−02 | 0.0000E+00 | 0.0000E+00 | 0.0000E+00 | 0.0000E+00 |

(SIGN "*" REPRESENTS AN ASPHERIC SURFACE)

TABLE 6

COMPARATIVE EXAMPLE 3

(a)

| SURFACE | LENS DATA | | | |
|---|---|---|---|---|
| NUMBER Si | Ri | Di | Ndj | νdj |
| *1 | 1.753 | 0.15 | 1.4910 | 57.6 |
| *2 | 0.659 | 1.70 | | |
| (Mk) 3 | ∞ | 0.90 | (MASK) | |
| 4 | 1.539 | 0.35 | 1.6069 | 37.9 |
| 5 | −9.650 | 1.09 | | |

TABLE 6-continued

COMPARATIVE EXAMPLE 3

| | | | | |
|---|---|---|---|---|
| 6 | −0.938 | 0.06 | 1.8467 | 23.8 |
| 7 | 4.004 | 0.00 | | |
| 8 | 4.130 | 0.47 | 1.7130 | 53.9 |
| 9 | −1.141 | 0.01 | | |
| *10 | 1.425 | 0.48 | 1.4910 | 57.6 |
| *11 | −3.991 | 0.46 | | |
| 12 | ∞ | 1.54 | 1.5163 | 64.1 |
| 13 | ∞ | | | |

(b)

| SURFACE NUMBER Si | ASPHERIC COEFFICIENT | | | | | |
|---|---|---|---|---|---|---|
| | K | A3 | A4 | A5 | A6 | A7 | A8 |
| 1 | 1.0000 | −1.2692E−01 | −3.7693E−02 | −9.3956E−01 | 2.0555E+00 | −5.8060E−02 | −3.4249E+00 |
| 2 | 0.0000 | −1.3408E−01 | −8.5769E−02 | 1.1393E−02 | −6.0226E−01 | 2.0039E+00 | 1.8231E+00 |
| 10 | 1.0000 | 0.0000E+00 | −5.4400E−02 | −3.4578E−02 | 6.9349E−02 | −3.6120E−02 | −3.8393E−02 |
| 11 | 1.0000 | 0.0000E+00 | 4.3135E−02 | 5.5315E−02 | −1.0194E−01 | 9.7777E−03 | 3.8552E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.5660E+00 | −1.2554E+00 | 3.1053E−02 | 1.8421E−02 | 9.3036E−03 | 4.2929E−03 |
| 2 | −7.6313E+00 | 5.3009E+00 | −3.2188E−01 | −1.9071E−01 | −1.0047E−01 | −4.9146E−02 |
| 10 | 1.1149E−03 | 1.7011E−02 | 0.0000E+00 | 0.0000E+00 | 0.0000E+00 | 0.0000E+00 |
| 11 | 3.4088E−03 | −1.2395E−02 | 0.0000E+00 | 0.0000E+00 | 0.0000E+00 | 0.0000E+00 |

(SIGN "*" REPRESENTS AN ASPHERIC SURFACE)

TABLE 7

COMPARATIVE EXAMPLE 4

(a)

| SURFACE NUMBER Si | LENS DATA | | | |
|---|---|---|---|---|
| | Ri | Di | Ndj | vdj |
| *1 | 1.493 | 0.15 | 1.4910 | 57.6 |
| *2 | 0.575 | 2.10 | | |
| (Mk) 3 | ∞ | 0.51 | (MASK) | |
| 4 | 1.846 | 0.35 | 1.8000 | 43.0 |
| 5 | −8.889 | 0.92 | | |
| 6 | −1.138 | 0.06 | 1.8052 | 25.4 |
| 7 | 1.827 | 0.00 | | |
| 8 | 1.714 | 0.36 | 1.7130 | 53.9 |
| 9 | −1.158 | 0.01 | | |
| *10 | 15.590 | 0.30 | 1.4910 | 57.6 |
| *11 | −1.949 | 0.51 | | |
| 12 | ∞ | 1.54 | 1.5163 | 64.1 |
| 13 | ∞ | | | |

(b)

| SURFACE NUMBER Si | ASPHERIC COEFFICIENT | | | | | |
|---|---|---|---|---|---|---|
| | K | A3 | A4 | A5 | A6 | A7 | A8 |
| 1 | 1.0000 | −2.2239E−01 | 5.2049E−02 | −9.7017E−01 | 2.0111E+00 | −5.5325E−02 | −3.3712E+00 |
| 2 | 0.0000 | −2.1338E−01 | −6.5894E−02 | 2.6213E−02 | −8.5460E−01 | 1.9747E+00 | 1.8734E+00 |
| 10 | 1.0000 | 0.0000E+00 | −4.4542E−01 | 8.1728E−02 | −5.6982E−01 | −2.6790E−01 | −1.1405E−01 |
| 11 | 1.0000 | 0.0000E+00 | −3.1779E−01 | 1.8907E−01 | −6.0108E−01 | −9.6248E−02 | 9.8900E−02 |

| SURFACE NUMBER Si | ASPHERIC COEFFICIENT | | | | | |
|---|---|---|---|---|---|---|
| | A9 | A10 | A11 | A12 | A13 | A14 |
| 1 | 3.5119E+00 | −1.2326E+00 | 2.9680E−02 | 1.7219E−02 | 8.5358E−03 | 3.8754E−03 |
| 2 | −7.4734E+00 | 5.2073E+00 | −3.2452E−01 | −1.9488E−01 | −1.0328E−01 | −5.0593E−02 |
| 10 | −1.1762E−01 | −1.2791E−01 | 0.0000E+00 | 0.0000E+00 | 0.0000E+00 | 0.0000E+00 |
| 11 | 9.8198E−02 | 7.0869E−02 | 0.0000E+00 | 0.0000E+00 | 0.0000E+00 | 0.0000E+00 |

(SIGN "*" REPRESENTS AN ASPHERIC SURFACE)

TABLE 8

| FORMULA NAME | ARITHMETIC EXPRESSION OR CONSTANT IN INEQUATION | VALUE CALCULATED BY ARITHMETIC EXPRESSION OR CONSTANT IN INEQUATION ||||||
|---|---|---|---|---|---|---|---|---|
| | | EXAMPLE 1-1 | EXAMPLE 1-2 | EXAMPLE 1-3 | COMPARATIVE EXAMPLE 1 | COMPARATIVE EXAMPLE 2 | COMPARATIVE EXAMPLE 3 | COMPARATIVE EXAMPLE 4 |
| (A) | Bf/f | 1.5 | 1.5 | 1.6 | 1.6 | 1.5 | 1.5 | 1.5 |
| (B) | f3F/f | −1.1 | −1.2 | −1.9 | −3.3 | −0.79 | −1.1 | −1.4 |
| (C) | f5F/f5 | 2.0 | 2.0 | 4.6 | 1.5 | 2.0 | 1.3 | 8.9 |
| (D) | d12/f | 2.0 | 2.2 | 1.9 | 1.2 | 1.5 | 1.7 | 2.6 |
| (E) | f34n/f | −11.9 | −6.2 | −9.5 | −9.7 | −31.3 | −25.8 | −40.5 |
| (F) | f2B/f | 12.5 | 16.5 | 4.6 | 4.2 | 22.7 | 15.9 | 2.6 |
| (G) | Fno | 1.4 | 1.4 | 1.4 | 1.4 | 1.4 | 1.4 | 1.4 |

UNDERLINED VALUE IN BOLD FONT REPRESEMTS VALUE OUTSIDE THE RANGE OF FORMULA

What is claimed is:

1. A lens for projection substantially consisting of five lenses, wherein a negative first lens having a concave surface facing the reduction side of the lens for projection, a positive second lens having a convex surface facing the magnification side of the lens for projection, a negative third lens having a concave surface facing the magnification side, a positive fourth lens having a convex surface facing the reduction side, and a positive fifth lens are arranged in this order from the magnification side, and
wherein the following formulas (A) through (D) are satisfied at the same time:

$$1.2 \leq Bf/f \leq 2.5 \qquad (A);$$

$$-3.0 \leq f3F/f \leq -0.8 \qquad (B);$$

$$1.4 \leq f5F/f5 \leq 8.5 \qquad (C); \text{ and}$$

$$1.0 \leq d12/f \leq 2.7 \qquad (D), \text{ where}$$

Bf is a back focus in air of the entire system of the lens for projection,
f is the focal length of the entire system of the lens for projection,
f3F is the focal length of a magnification-side surface of the third lens,
f5F is the focal length of a magnification-side surface of the fifth lens,
f5 is the focal length of the fifth lens, and
d12 is an air space between the first lens and the second lens.

2. A lens for projection, as defined in claim 1, wherein a gap is present between a reduction-side surface of the third lens and a magnification-side surface of the fourth lens, and
wherein the following formula (E) is satisfied:

$$f34n/f \leq -2.5 \qquad (E), \text{ where}$$

f34n is the focal length of an air lens formed between the reduction-side surface of the third lens and the magnification-side surface of the fourth lens.

3. A lens for projection, as defined in claim 2, wherein the following formula (F) is satisfied:

$$2.5 \leq f2B/f \leq 25.0 \qquad (F), \text{ where}$$

f2B is the focal length of a reduction-side surface of the second lens.

4. A lens for projection, as defined in claim 3, wherein the reduction side of the lens for projection is telecentric.

5. A lens for projection, as defined in claim 4, wherein at least one of surfaces of the first lens is aspheric.

6. A lens for projection, as defined in claim 5, wherein at least one of surfaces constituting the fourth lens and the fifth lens is aspheric.

7. A lens for projection, as defined in claim 6, wherein the first lens having at least an aspheric surface is made of resin, and
wherein the fourth lens is made of resin if the fourth lens has at least an aspheric surface, and
wherein the fifth lens is made of resin if the fifth lens has at least an aspheric surface.

8. A lens for projection, as defined in claim 7, wherein all of lenses constituting the lens for projection are single lenses.

9. A lens for projection, as defined in claim 8, wherein the following formula (G) is satisfied:

$$Fno \leq 1.8 \qquad (G), \text{ where}$$

Fno is the F-number of the entire system of the lens for projection.

10. A lens for projection, as defined in claim 1, wherein the following formula (F) is satisfied:

$$2.5 \leq f2B/f \leq 25.0 \qquad (F), \text{ where}$$

f2B is the focal length of a reduction-side surface of the second lens.

11. A lens for projection, as defined in claim 1, wherein the reduction side of the lens for projection is telecentric.

12. A lens for projection, as defined in claim 1, wherein at least one of surfaces of the first lens is aspheric.

13. A lens for projection, as defined in claim 12, wherein at least one of surfaces constituting the fourth lens and the fifth lens is aspheric.

14. A lens for projection, as defined in claim 13, wherein the first lens having at least an aspheric surface is made of resin, and
wherein the fourth lens is made of resin if the fourth lens has at least an aspheric surface, and
wherein the fifth lens is made of resin if the fifth lens has at least an aspheric surface.

15. A lens for projection, as defined in claim 1, wherein all of lenses constituting the lens for projection are single lenses.

16. A lens for projection, as defined in claim 1, wherein the following formula (G) is satisfied:

$$Fno \leq 1.8 \qquad (G), \text{ where}$$

Fno is the F-number of the entire system of the lens for projection.

17. A projection-type display apparatus comprising:
a lens for projection, as defined in claim 1;
a light source; and a light valve for modulating rays of light output from the light source, wherein rays of light modulated by the light valve are projected through the lens for projection.

* * * * *